(12) United States Patent
Vasseur

(10) Patent No.: US 7,551,569 B2
(45) Date of Patent: Jun. 23, 2009

(54) EFFICIENT TUNNEL PLACEMENT IN A COMPUTER NETWORK USING DISTRIBUTED SYNCHRONIZATION

(75) Inventor: Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 413 days.

(21) Appl. No.: 11/590,507

(22) Filed: Oct. 31, 2006

(65) Prior Publication Data

US 2008/0101418 A1    May 1, 2008

(51) Int. Cl.
*H04L 12/26* (2006.01)
*H04L 12/56* (2006.01)

(52) U.S. Cl. ..................... 370/252; 370/401
(58) Field of Classification Search ......... 370/252–255, 370/400, 401
See application file for complete search history.

(56) References Cited

U.S. PATENT DOCUMENTS

| | | | |
|---|---|---|---|
| 6,519,254 B1 * | 2/2003 | Chuah et al. ................. | 370/389 |
| 6,665,273 B1 * | 12/2003 | Goguen et al. ............... | 370/252 |
| 6,839,353 B1 * | 1/2005 | DeJager ................. | 370/395.21 |
| 6,978,394 B1 | 12/2005 | Charny et al. | |
| 7,031,262 B2 | 4/2006 | Vasseur et al. | |
| 7,139,276 B1 * | 11/2006 | Sitaraman et al. ............. | 370/401 |
| 2002/0110087 A1 * | 8/2002 | Zelig et al. ................. | 370/236 |
| 2003/0177221 A1 * | 9/2003 | Ould-Brahim et al. ...... | 709/223 |
| 2003/0233595 A1 | 12/2003 | Charny et al. | |
| 2004/0052207 A1 | 3/2004 | Charny et al. | |

OTHER PUBLICATIONS

Awduche, et al., "RSVP-TE: Extensions to RSVP for LSP Tunnels", Network Working Group, Request for Comments 3209, Dec. 2001, pp. 1-57, IETF.

Smit, et al., "Intermediate System to Intermediate System (IS-IS) Extensions for Traffic Engineering (TE)", Network Working Group, Request for Comments 3784, Jun. 2004, pp. 1-13, IETF.

Katz, et al., "Traffic Engineering (TE) Extensions to OSPF Version 2", Network Working Group, Request for Comments 3630, Sep. 2003, pp. 1-14, IETF.

(Continued)

*Primary Examiner*—Hong Cho
(74) *Attorney, Agent, or Firm*—Cesari and McKenna, LLP

(57) ABSTRACT

In one embodiment, a node (e.g., a "rearranging node") receives a trigger to rearrange one or more tunnels having a respective bandwidth value. In response, the rearranging node signals each of the tunnels with zero bandwidth at a configured time shared by the node and one or more other rearranging nodes. The node then signals each of the tunnels with its respective bandwidth value at a corresponding calculated time beyond the configured time, the corresponding calculated time for each tunnel being inversely proportional to the respective bandwidth value of that corresponding tunnel. Also, in one embodiment, a node may determine that a reason exists to rearrange tunnels, and in response, may send a trigger to one or more rearranging nodes to request that those nodes rearrange their tunnels.

20 Claims, 10 Drawing Sheets

OTHER PUBLICATIONS

Braden, et al., "Resource ReSerVation Protocol (RSV)—Version 1 Functional Specification", Network Working Group, Request for Comments 2205, Sep. 1997, pp. 1-105, IETF.

Berger, L., "Generalized Multi-Protocol Label Switching (GMPLS) Signaling Resource ReserVation Protocol-Traffic Engineering (RSVP-TE) Extensions", Network Working Group, Request for Comments 3473, Jan. 2003, pp. 1-40, IETF.

Mannie, E., "Generalized Multi-Protocol Label Switching (GMPLS) Architecture", Network Working Group, Request for Comments 3945, Oct. 2004, pp. 1-65, IETF.

Mannie, et al., "Generalized Multi-Protocol Label Switching (GMPLS) Extensions for Synchronous Optical Network (SONET) and Synchronous Digital Hierarchy (SDH) Control", Network Working Group, Request for Comments 3946, Oct. 2004, pp. 1-25, IETF.

* cited by examiner

EFFICIENT TUNNEL PLACEMENT IN A COMPUTER NETWORK USING DISTRIBUTED SYNCHRONIZATION

TECHNICAL FIELD

The present disclosure relates generally to computer networks, and, more particularly, to placing tunnels within computer networks.

BACKGROUND

Path computation for tunnels of a computer network, e.g., label switched paths (LSPs), is generally performed in a distributed manner, where each head-end node of the tunnels computes paths for its tunnels independently from head-end nodes of other tunnels. For example, tunnels in many Multi-Protocol Label Switching (MPLS) Traffic Engineering (TE) networks (e.g., MPLS TE-LSPs) are computed using a distributed constrained shortest path first (CSPF) algorithm. As those skilled in the art will understand, distributed CSPF offers high flexibility/scalability, and is well-equipped to handle frequent topology changes, dynamic traffic demands, and resource availability changes.

One problem associated with distributed path computation is that while it may be highly flexible/scalable, it may be inefficient for optimizing tunnel placement within the network, particularly due to the lack of path computation coordination among the head-end nodes. By not coordinating the path computation of tunnels (i.e., beyond being aware of what tunnels currently exist in the network), available resources of the network (e.g., bandwidth) may be allocated inefficiently and may become fragmented. Bandwidth fragmentation, in turn, may result in an inability to place larger tunnels (i.e., those reserving larger bandwidth) because of the placement of the smaller tunnels previously established. For instance, if many smaller tunnels are reserved throughout the network, those smaller tunnels may "fragment" the bandwidth of the network, to the extent that even if a large amount of bandwidth is available from a source to a destination, that bandwidth may be fragmented into smaller amounts along multiple paths such that no one path exists upon which a large tunnel may be placed. Also, where a path does exist for the larger tunnels, that path may be at a larger (e.g., substantially larger) cost (e.g., cost, length, etc.) than had the larger tunnels been placed before the smaller tunnels.

Due to the distributed nature of path computation for tunnels (e.g., distributed CSPF), it has generally not been possible to coordinate the establishment of large and small tunnels in a computer network such that substantially all tunnels can be placed (provided there is sufficient bandwidth for all tunnels as a whole), and at a lower network-average cost. Previous attempts to place larger tunnels involved using priority levels to denote larger tunnels (higher priority) and smaller tunnels (lower priority). These attempts, however, are complex in design, and because there are commonly only a limited number of priorities (e.g., eight), the use of priority is limited in scalability for wide ranges of tunnel sizes. Furthermore, such a scheme generally cannot be used for tunnels that have the same priority.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
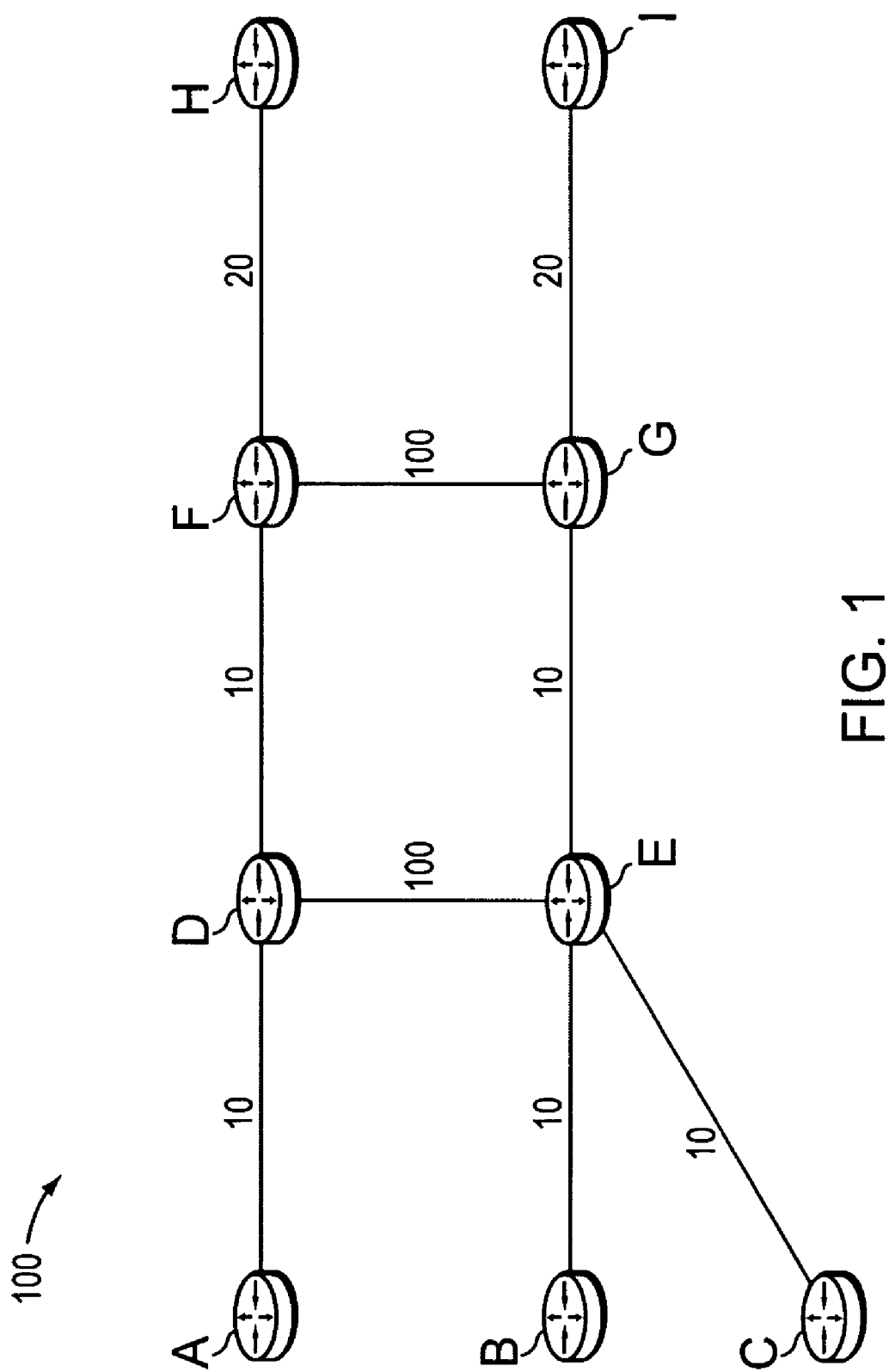
FIG. 1 illustrates an example computer network.

According to embodiments of the disclosure, a node (e.g., a "rearranging node") receives a trigger to rearrange one or more tunnels having a respective bandwidth value. In response, the rearranging node signals each of the tunnels with zero bandwidth at a configured time shared by the node and one or more other rearranging nodes. The node then signals each of the tunnels with its respective bandwidth value at a corresponding calculated time beyond the configured time, the corresponding calculated time for each tunnel being inversely proportional to the respective bandwidth value of that corresponding tunnel.

Also, according to embodiments of the disclosure, a node (e.g., a "triggering node") may determine that a reason exists to rearrange tunnels, and in response, may send a trigger to one or more rearranging nodes to request that those nodes rearrange their tunnels.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain," and a router that interconnects different domains is generally referred to as a "border router."

FIG. 1 is a schematic block diagram of an example computer network 100 illustratively comprising nodes (e.g., routers) A-I interconnected by links as shown. Illustratively, assume that the number adjacent to each link represents a maximum available bandwidth for that link (e.g., "10" for link D-F may represent 10 megabits per second, or "10 Mbps"). Those skilled in the art will understand that any number of nodes, routers, links (e.g., with any bandwidth values), etc. may be used in the computer network, and that the view shown herein is for simplicity. Those skilled in the art will also understand that while the present invention is described generally, it may apply to provider core network with provider (P) and provider edge (PE) routers, any network configuration within an AS or area/level, or throughout multiple ASes or areas/levels, etc.

Data packets may be exchanged among the nodes of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
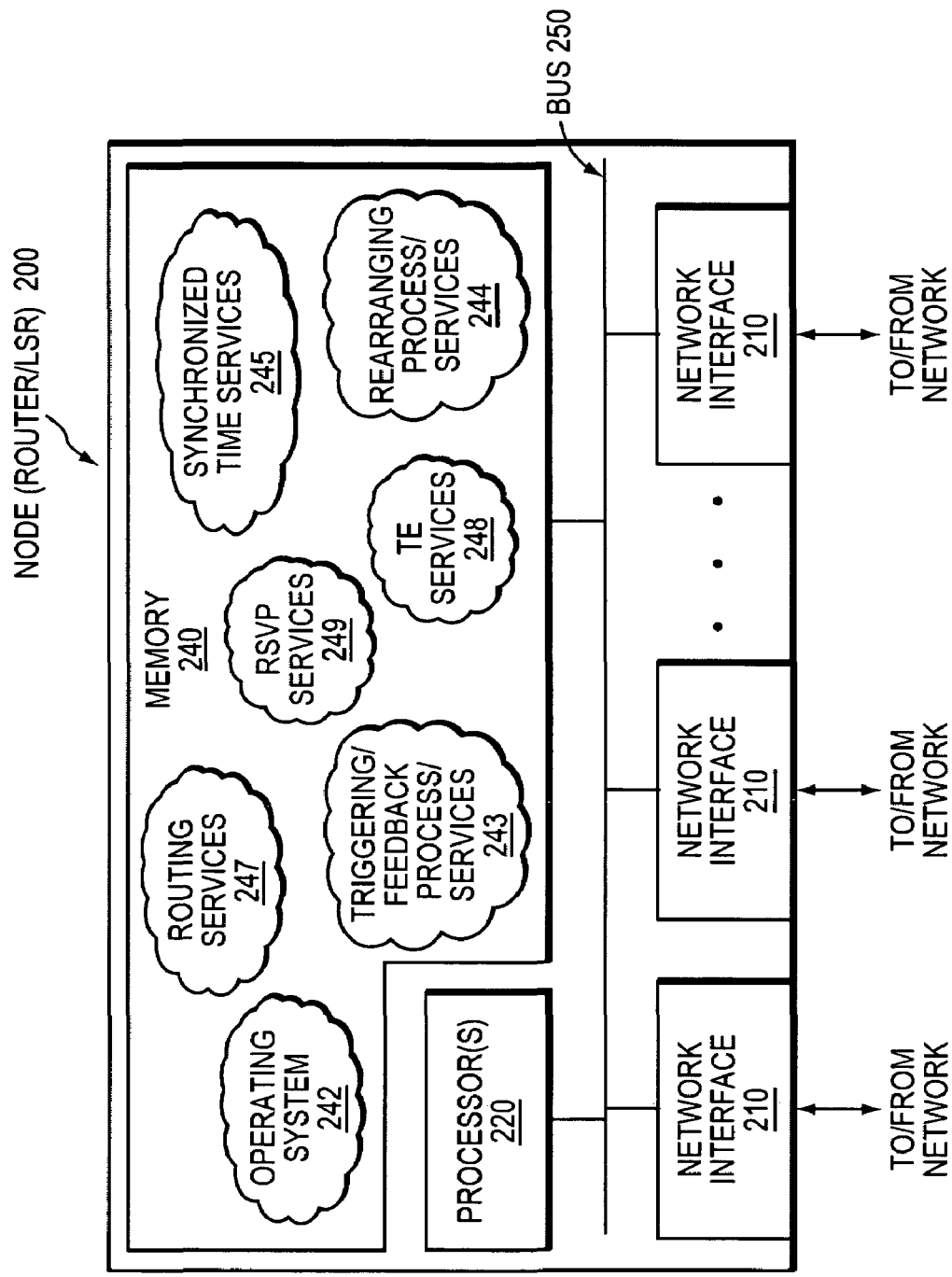
FIG. 2 illustrates an example network device/node.

FIG. 2 is a schematic block diagram of an example node/router 200 that may be advantageously used with one or more embodiments described herein, e.g., as a head-end node (label switched router, "LSR"). The node comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor, functionally organizes the node by, inter alia, invoking network operations in support of software processes and/or services executing on the router. These software processes and/or services may comprise routing services 247, Resource ReSerVation Protocol (RSVP) services 249, Traffic Engineering (TE) services 248, and as described herein, an example triggering/feedback process/services 243, rearranging process/services 244, and synchronized time services 245. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing services 247 may also perform functions related to virtual routing protocols, such as maintaining VRF instances (not shown) as will be understood by those skilled in the art.

Changes in the network topology within the local domain (network 100) may be communicated among routers 200 within the network 100 using IGP services, such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Figure 3:
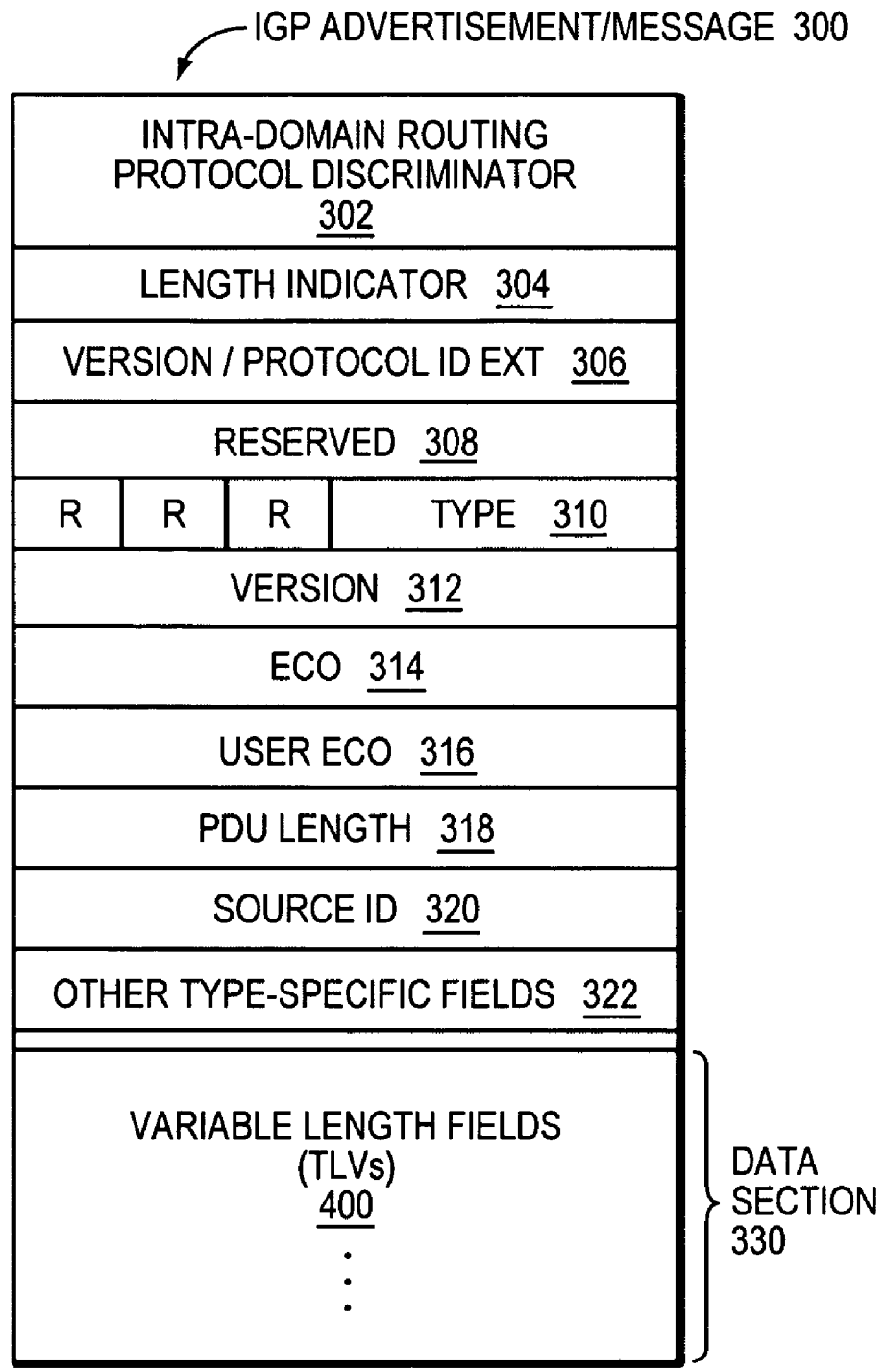
FIG. 3 illustrates an example IGP advertisement.

FIG. 3 illustrates an example IGP advertisement 300 that may be flooded by the routers 200. Illustratively, IGP advertisement 300 is shown as an IS-IS link state packet. Those skilled in the art will understand, however, that other IGP advertisements may be used in accordance with the one or more embodiments described herein, such as, e.g., OSPF link state advertisements, etc. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are reserved for future use with the protocol, as are the ECO and User ECO fields 314 and 316, all of which are illustratively ignored by the receiving router until directed for decoding in future versions of the protocol.

A type field 310 (and corresponding version field 312) stores a value indicating the type (and version) of advertisement 300 being transmitted, which may define the existence of other type-specific fields 322 within the advertisement. For example, the type of advertisement may be a link state packet, a "Hello" packet, etc., as will be understood by those skilled in the art. The PDU length field 318 stores a value indicating the length of the entire PDU (Protocol Data Unit, or advertisement 300), including the header, type-specific fields, and data fields. A source ID field 320 stores a value that identifies the router that generated and originally broadcast the advertisement 300.

The other type-specific fields 322 may include any number of fields as defined by the protocol, such as checksum fields, maximum area address fields, etc., as understood by those skilled in the art. For example, a sequence-number field (not shown) may store a sequence number indicating the relative version of the advertisement 300. Typically, the sequence number stored in the field is incremented, e.g., by one, for every new version of the advertisement. The advertisement 300 is therefore considered "stale" (invalid) if its sequence number is less than the sequence number stored in a previously-received version of the advertisement, i.e., generated by the same advertising node. Accordingly, the routers 200 may be configured to store and forward only the most recent version of an advertisement, e.g., the version having the largest sequence number. A remaining lifetime field (not shown) may also be used to store a value that may be used for determining whether the advertisement 300 is valid. The remaining lifetime value is typically initialized to a non-zero integer value, often in units of seconds. The remaining lifetime value may be decremented, e.g., by one every second, until the remaining lifetime value reaches zero, thereby indicating that the advertisement has become invalid. That is, every router 200 that stores or floods the advertisement 300 continuously ages the packet until the remaining lifetime value equals zero. Those skilled in the art will appreciate that other aging mechanisms alternatively may be used, such as incrementing the advertisement remaining lifetime value from an initial value, e.g., equal to zero, until the remaining lifetime value reaches a known upper limit.

The data section 330 includes one or more variable length fields 400, which each have a specific type (or code), length, and value (TLV) as described further herein. For example, to advertise network topology, one or more pairs of neighboring-node fields (not shown) and cost fields (not shown) may be used. The neighboring-node fields may store a value, such as an address, indicating a network node that is directly accessible from the intermediate node identified in the source ID field 320. The cost field may store a value that has been associated, e.g., by the advertising node, with the network node identified in the neighboring-node field. It is noted that in other embodiments, a single neighboring node may be associated with a plurality of cost values. Other routing information may also be included in the variable length fields 400 of the IGP advertisement 300, such as checksum values, padding fields, proprietary fields, etc., and one or more novel "trigger" fields (e.g., sub-TLVs in a Router Capability TLV), described further below. Generally, the received IGP advertisements are stored in a link state database (LSDB) of the router 200.

In particular, the TLV encoded format is used to identify a type (T) of information being communicated (conveyed), a length (L) of information to be conveyed, and a value (V) of the actual information conveyed. The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
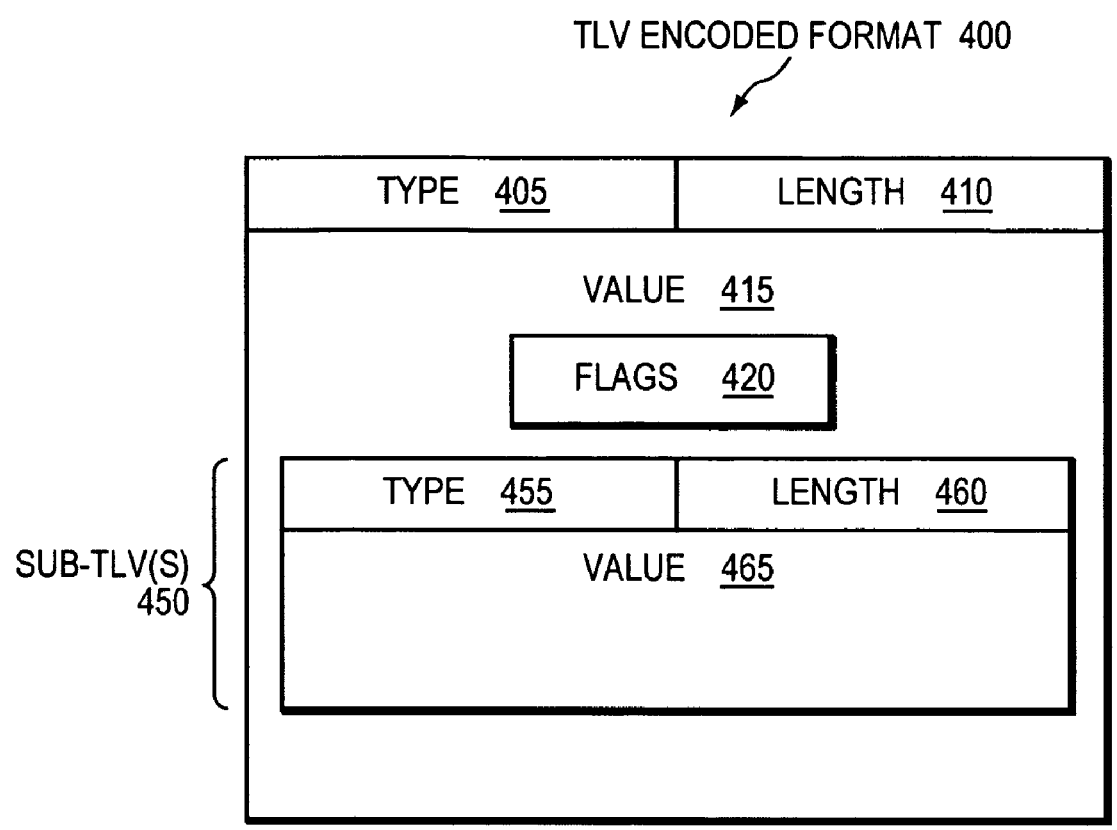
FIG. 4 illustrates an example TLV format.

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners, including as described herein, according to the embodiments described herein. Notably, for use with OSPF link state advertisements as IGP advertisements 300, TLVs 400 (e.g., in accordance with the embodiments described herein) may be contained within specific types of advertisements (e.g., Router Information advertisements), or with opaque advertisements, as will be understood by those skilled in the art. The use of IS-IS link state packets, therefore, is merely a representative example.

Multi-Protocol Label Switching (MPLS) Traffic Engineering (TE) has been developed to meet data networking requirements such as guaranteed available bandwidth or fast restoration. MPLS TE exploits modern label switching techniques to build end-to-end tunnels based on a series of constraints through an IP/MPLS network of label switched routers (LSRs). These tunnels are a type of label switched path (LSP) and thus are generally referred to as MPLS TE-LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205, the contents of which are hereby incorporated by reference in their entirety. In the case of traffic engineering applications, RSVP signaling is used to establish a TE-LSP (tunnel) and to convey various TE-LSP attributes to routers, such as border routers, along the TE-LSP obeying the set of required constraints whose path may have been computed by various means.

In particular, RSVP services 249 contain computer executable instructions for implementing RSVP and processing RSVP messages in accordance with the embodiments described herein. Further, TE services 248 contain computer executable instructions for implementing TE functions in accordance with the embodiments described herein. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. A TE database (TED, not shown) may be illustratively resident in memory 240 and used to store TE information provided by the routing protocols, such as IGP, BGP, and/or RSVP (e.g., with TE extensions as described herein). The TED may be illustratively maintained and managed by TE services 244.

Tunnels. e.g., MPLS TE-LSPs, can be configured within a single domain, e.g., area, level, or AS, or may also span multiple domains, e.g., areas, levels, or ASes, and may have guaranteed bandwidth under certain conditions. Illustratively, the tunnels (e.g., TE-LSPs) may be signaled through the use of the RSVP protocol (with Traffic Engineering extensions), and in particular, RSVP TE signaling messages. It should be understood that the use of RSVP serves only as an example, and that other communication protocols may be used in accordance with the embodiments described herein.

Establishment of a tunnel (e.g., TE-LSP) requires computation of a path between a head-end node (LSR) to a tail-end node, signaling along the path, and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node or by some other entity operating as a path computation element (PCE) not co-located on the head-end node. The head-end node (or a PCE) exploits its knowledge of network topology and resources available on each link to perform the path computation according to the LSP Traffic Engineering constraints. Various path computation methodologies are available including CSPF (constrained shortest path first).

As noted, distributed CSPF may be used in a network, such that each head-end node of a tunnel computes its own tunnel paths through the network. A problem with distributed path computation is that it may be inefficient for optimizing tunnel placement within the network. For example, placing smaller tunnels (i.e., reserving smaller bandwidth) prior to larger tunnels (i.e., reserving larger bandwidth) may result in inefficient resource allocation and fragmented bandwidth. Moreover, based on the order in which tunnels are established in a distributed manner, certain tunnels may be unable to achieve placement, or if so, may be required to have much larger costs than need be.

Distributed Synchronization of Tunnel Placement

According to embodiments of the disclosure, a node (e.g., a "rearranging node") receives a trigger to rearrange one or more tunnels having a respective bandwidth value. In response, the rearranging node signals each of the tunnels with zero bandwidth at a configured time shared by the node and one or more other rearranging nodes. The node then signals each of the tunnels with its respective bandwidth value at a corresponding calculated time beyond the configured time, the corresponding calculated time for each tunnel being inversely proportional to the respective bandwidth value of that corresponding tunnel.

Figure 5A:
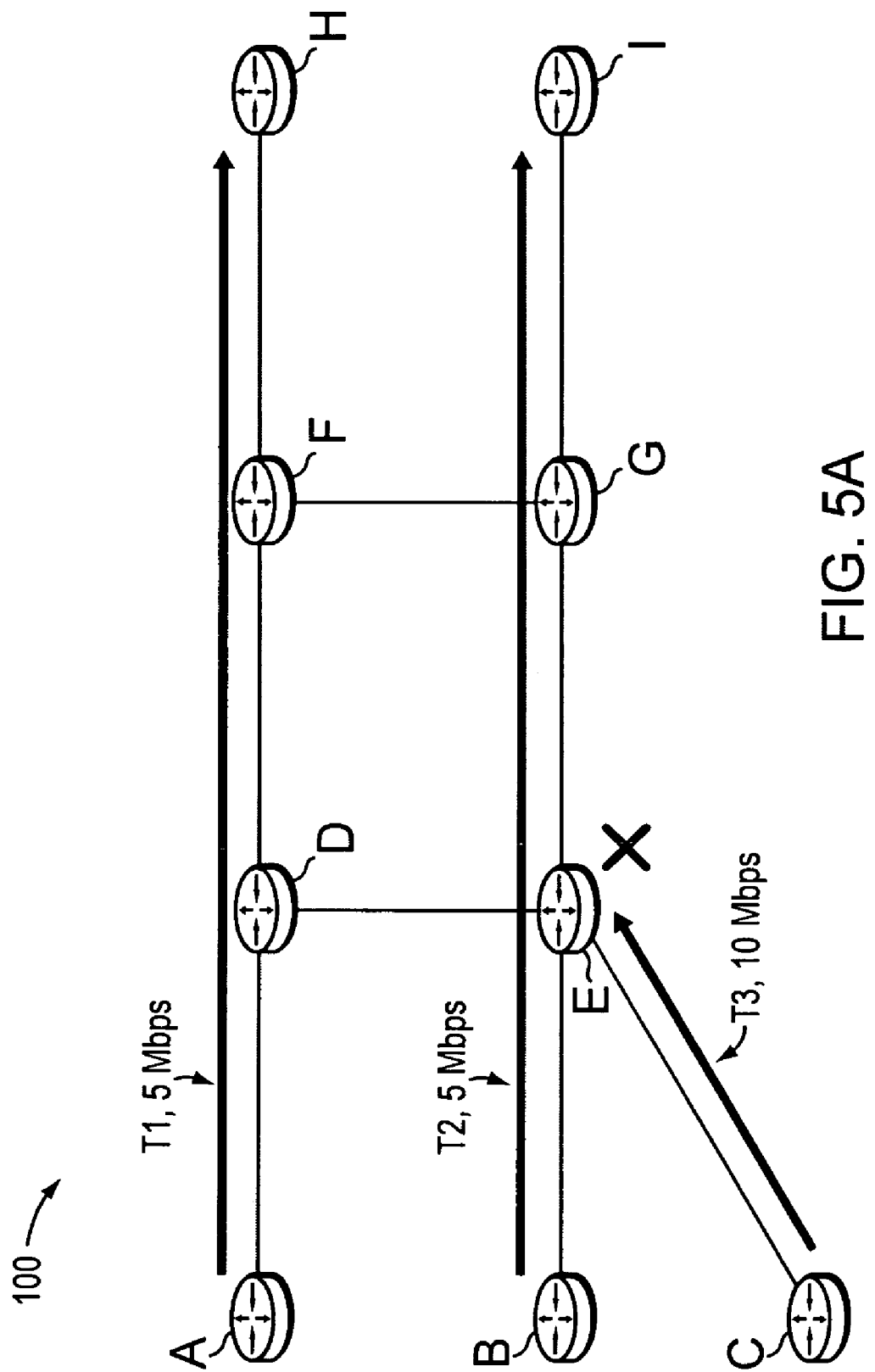
FIGS. 5A-C illustrate an example computer network with synchronized and distributed tunnel placement.

First, it may be determined that a reason exists to rearrange tunnels of the network. For instance, FIG. 5A illustrates an example network 100 as in FIG. 1 showing tunnels placed on the links of the network. Assume that head-end node A has established a tunnel "T1" along the path A-D-F-H to tail-end node H, illustratively reserving 5 Mbps. Also, head-end node B has established a tunnel "T2" along the path B-E-G-I to tail-end node I, reserving 5 Mbps. Particularly, those skilled in the art will understand that each link D-F and E-G along those paths now have (10-5) or 5 Mbps of available bandwidth for reservation. Assume further that a third head-end node C wishes to establish (signal) a 10 Mbps tunnel "T3" along the path C-E-G-I to tail-end node I. By examining the network with T1 and T2 established, it is clear that no path is available for node C to establish T3, since neither link D-F nor E-G have sufficient bandwidth (e.g., at least 10 Mbps). It is said that T1 and T2 are "blocking" T3, in that T1 and T2 are a reason T3 cannot be established. (Note that T2 is blocking T3 from its shortest path, as well.) Were the tunnels T1-T3 to be rearranged, it may be possible to place each of the tunnels in the network 100 (described below). Node C may then determine that a reason exists to rearrange the tunnels of the network, particularly because it is unable to place one or more of its tunnels (e.g., T3).

Other reasons may exist for triggering the rearrangement of tunnels in the network in accordance with one or more embodiments described herein. For example, in addition to determining that an inability to place one or more tunnels exists, it may also be possible that one or more associated costs of tunnels is unacceptable. For instance, in the example above, assume that T3 could be placed within the network along nodes that have a high cost (e.g., high cost metric and/or large number of hops) to the tail-end node I (path not shown). In this case, it may also be determined that an attempt to rearrange the tunnels may result in lower costs for the tunnel T3.

Further, reasons may exist to rearrange tunnels based on accumulated statistics of tunnels. For example, a decrease in successful tunnel establishments over time, a number of unsuccessful tunnel establishments, an increase in unsuccessful tunnel establishments over time, an increase in newly established tunnel costs, etc., may each be considered a reason to rearrange tunnels in the network. Illustratively, a network management system (NMS), not explicitly shown, may monitor the network for any or all of these reasons in order to determine cause for rearrangement. Alternatively, each node 200 of the network 100 may also monitor these events for itself (e.g., and/or for other nodes in the network). Also, a reason to rearrange tunnels may be as simple as a configured rearrangement timer, such as scheduling a rearrangement once every day, week, month, etc., or even in response to a manual command (e.g., from a system administrator) to rearrange the tunnels.

In accordance with one or more embodiments described herein, a "triggering node" may determine that a reason exists for rearranging the tunnels in the network. Illustratively, the triggering node may be one of the rearranging nodes (e.g., node C) that has determined for itself that a reason exists for rearranging tunnels in the network. Also, nodes 200 of the network 100 that may act as triggering nodes may include (i) any of the nodes, (ii) only rearranging nodes, (iii) only a subset of the nodes (e.g., larger nodes, such as large Points of Presence, or POPs, as opposed to small nodes, e.g., small routers), etc. For example, if node C is a large node or POP (e.g., with a large number of tunnels or a number of large tunnels, etc.), it may be allowed/configured to act as a triggering node. Conversely, if node C is a small node, such as a small router (e.g., with only one or a few tunnels), it may not be allowed/configured to act as a triggering node. Alternatively or in addition, an NMS may act as the triggering node. For instance, where an NMS detects a reason within the network to rearrange tunnels (e.g., described above), or in response to a system administrator's manual intervention, the triggering node (NMS) may send a trigger to the rearranging nodes accordingly.

In response to determining that a reason exists to rearrange tunnels in the network, a triggering node (e.g., node C) may send a trigger into the network to one or more rearranging nodes (e.g., using triggering process 243). Illustratively, the trigger is configured as an IGP advertisement 300, such as an IGP update message, which may be limited in propagation scope, such as to a particular area/level, AS, etc., as will be understood by those skilled in the art. For example, the trigger may be embodied as one or more TLVs/fields 400 and/or sub-TLVs/fields 450 within the advertisement 300. For instance, the IGP advertisement 300 may be an IS-IS link-state packet (shown above). As such, an example TLV into which the trigger may be placed is within the conventional Router Capability TLV 400 (e.g., where the trigger is a novel sub-TLV 450 or flag 420), or within a separate TLV 400 of the link-state packet. Alternatively, an OSPF link-state advertisement 300 may be used, such as a Router Information link-state advertisement (e.g., where the trigger is a novel sub-TLV 450 or flag 420), or within an Opaque link-state advertisement, where the trigger may be a novel TLV 400. Those skilled in the art will understand the use of TLVs 400 and sub-TLVs 450 (described herein) are merely representative examples of triggers. Notably, other trigger message configurations may be used in accordance with one or more embodiments described herein, such as explicit triggering messages (a new communications protocol), BGP messages, etc., particularly where the trigger is to traverse multiple ASes.

In addition to triggering the rearrangement of tunnels, the trigger (e.g., IGP advertisement 300) may comprise various values corresponding to the trigger, e.g., in value field 415 and/or one or more corresponding sub-TLVs 450. For instance, a configured time value, "Tr," may be included within the trigger to instruct all rearranging nodes receiving the trigger to rearrange tunnels according to the same configured time. For example, the configured time may be based on a synchronized network time shared by the rearranging nodes, such as the conventional network time protocol (NTP) (e.g., through synchronized time services 245). Generally, the NTP is a time protocol that is shared by nodes 200 of the network 100 to synchronize time determinations ("clocks") among the nodes of the network (e.g., 12:00 AM on one node is substantially the same as 12:00 AM on any other node).

The configured time value Tr may be an explicit time, such as, e.g., 3:00 AM Monday, or may be a generalized time, such as at the next hour, etc. The configured time is shared by all routers in the network in order to synchronize the distributed rearrangement of tunnels as described herein. As those skilled in the art will understand, it may be beneficial to configure the time to be one with low traffic (e.g., 3:00 AM), such that low network impact occurs during rearranging of tunnels. Also, the trigger may comprise other values that are to be shared or known by substantially all of the rearranging nodes as described herein, such as a delay value "Q," a multiplier "k," a weight value, etc., described in detail below.

In response to receiving a trigger, at the configured time (Tr, e.g., 3:00 AM Monday), each rearranging node (e.g., nodes A-C) signals each of its respective tunnels with zero bandwidth. Because the tunnels reserve zero bandwidth (e.g., until re-signaled with actual bandwidth, described below), the path of each tunnel is unconstrained (i.e., at least in terms of bandwidth), and thus will take the shortest path available to its destination tail-end node (e.g., based only on its other constraints, if any). In this manner, all tunnels that are to be rearranged are currently signaled on their respective shortest paths. In particular, the tunnels may be signaled with zero bandwidth to ensure that no other tunnel is "blocking" another tunnel from being signaled with its full bandwidth. For instance, if a larger tunnel is being blocked by one or more smaller tunnels, the larger tunnel is unable to signal its bandwidth until the smaller tunnel has un-reserved its bandwidth (i.e., with a zero bandwidth reservation). Notably, in the event multiple triggers are received prior to signaling the zero bandwidth tunnels, those other triggers may be ignored/consolidated into this rearrangement configured time.

Figure 5B:
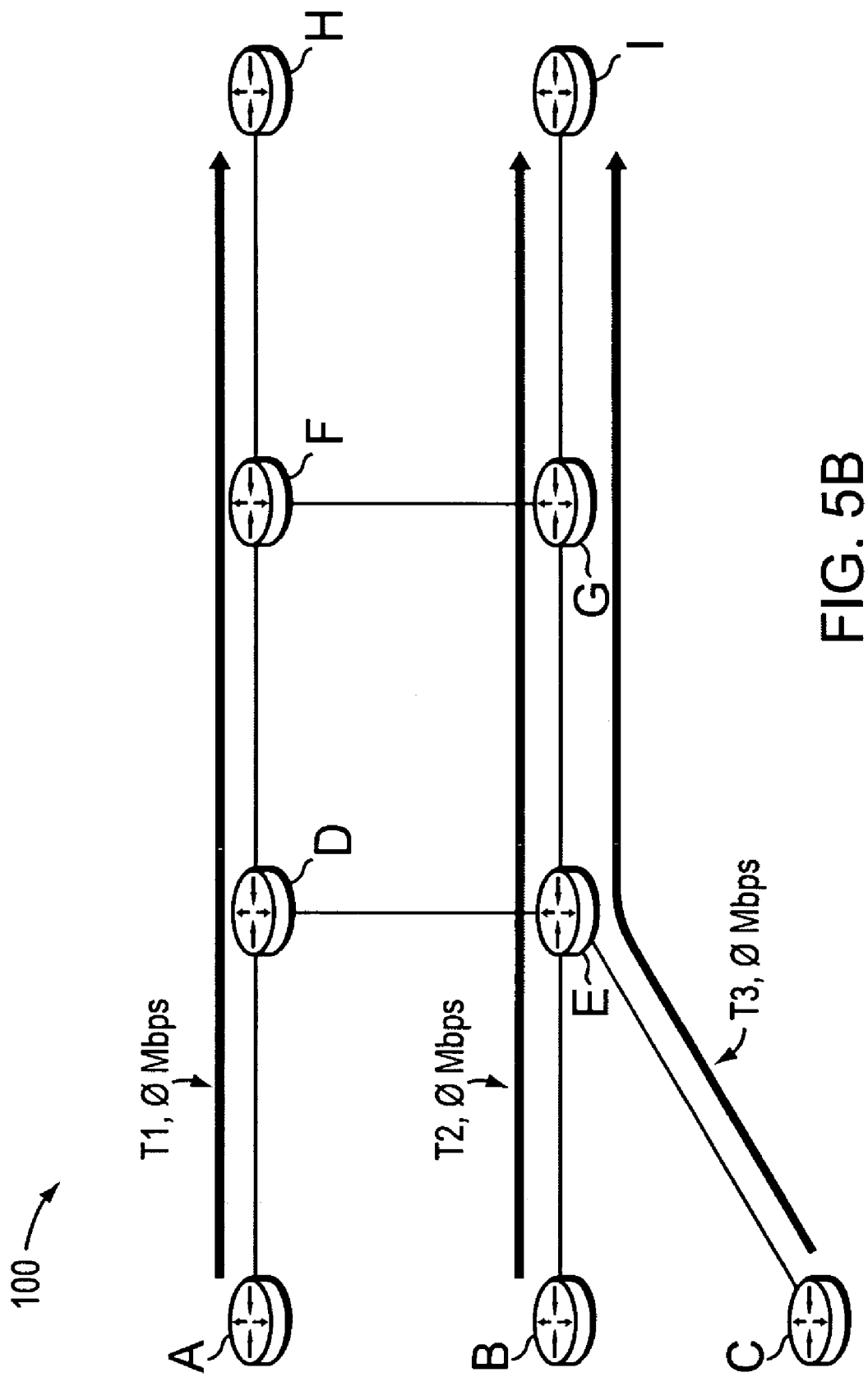

FIG. 5B illustrates the network 100 of FIG. 5A having tunnels T1-T3 signaled with zero bandwidth. For example, while tunnel T3 was originally blocked by T2 (on link E-G), both T2 and T3 may share the previously blocked path as neither tunnel reserves any bandwidth. Thus, it can be seen in FIG. 5B that each zero bandwidth tunnel T1-T3 traverses its shortest path to its respective tail-end node accordingly (e.g., assuming equal cost links throughout the network 100).

Figure 6A:
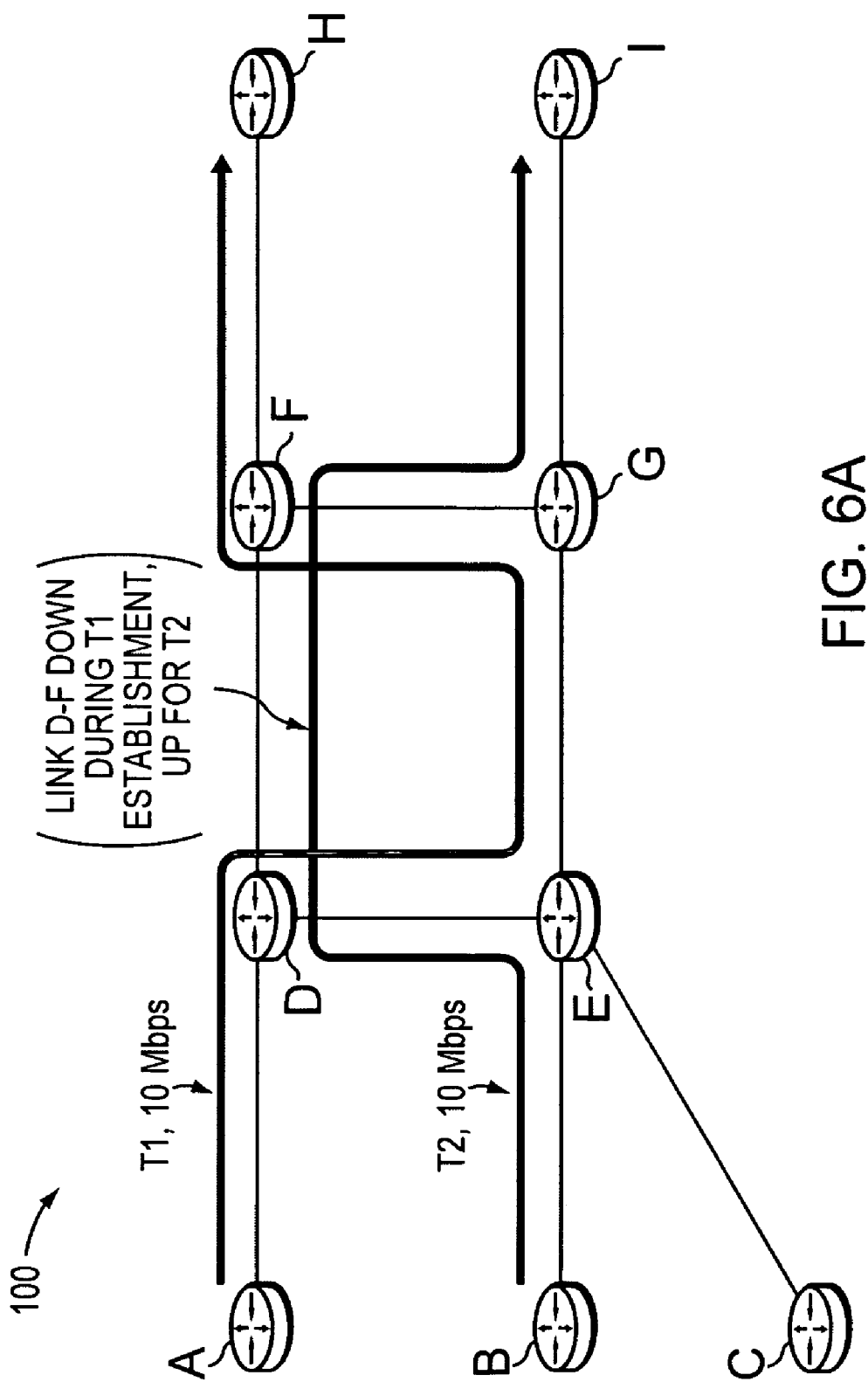
FIGS. 6A-B illustrate another example computer network with synchronized and distributed tunnel placement.
Figure 6B:
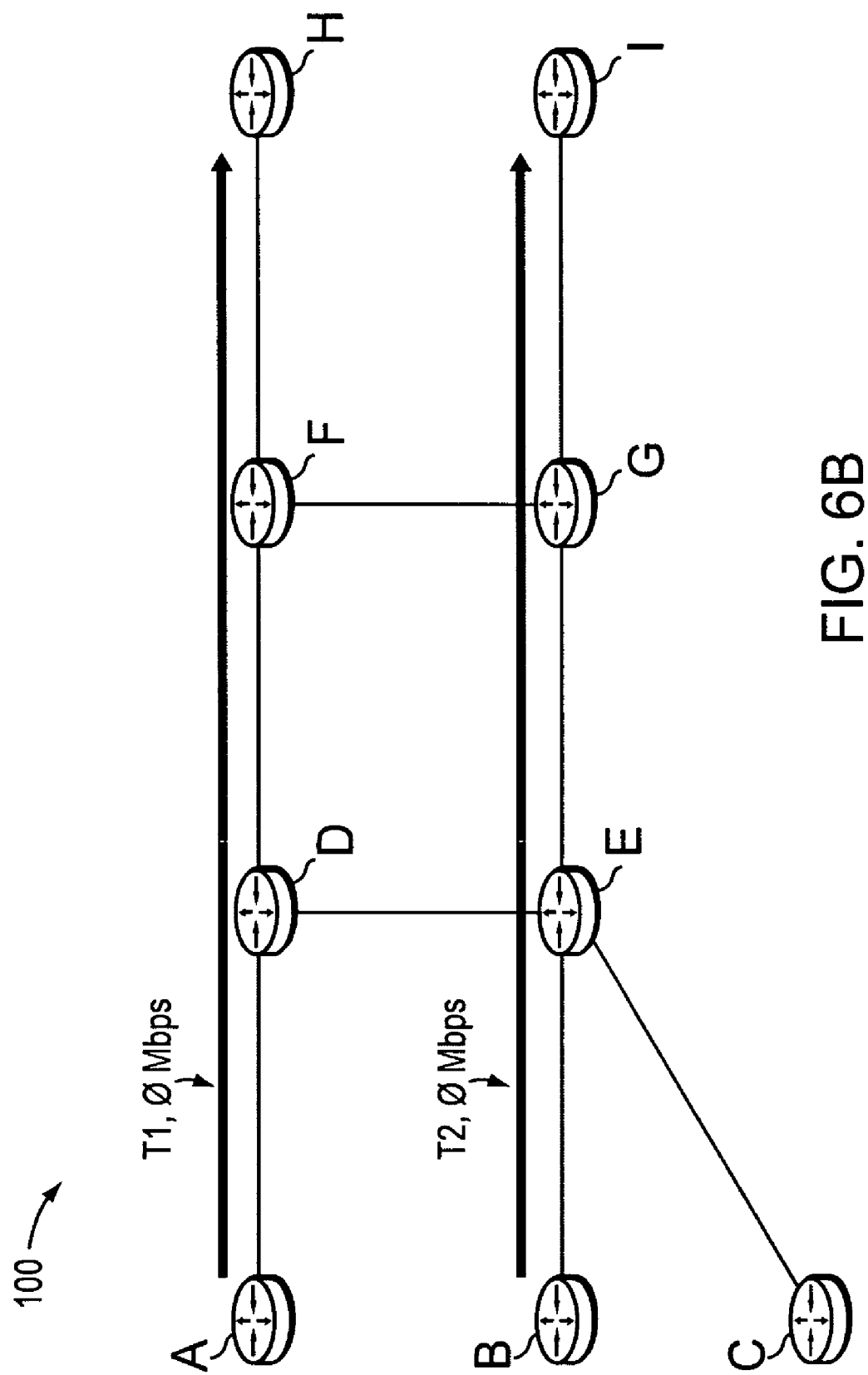

FIG. 6A illustrates an example network configuration where two tunnels (e.g., with equal bandwidth) may block each other. In particular, assume tunnel T1 was established initially when link D-F was unavailable, and before T2. T1 thus illustratively traverses the path A-D-E-G-F-H. Now assume tunnel T2 is established after T1, and after link D-F becomes available. Since T1 has fully reserved link E-G, T2 traverses path B-E-D-F-G-I. It can thus be seen that neither tunnel has been established along its shortest path, and that each tunnel is blocked from re-signaling along its shortest path. In accordance with one or more embodiments described herein, then, the rearranging nodes (A and B) may signal their tunnels with zero bandwidth, so that the tunnels are unblocked, and may be signaled along their respective shortest paths (shown in FIG. 6B).

Notably, each tunnel may be signaled with zero bandwidth at the configured time in addition to a random delay value. In this manner, the network 100 does not experience a burst of signals for all rearranged tunnels at the configured time. (Since each tunnel is signaled reserving no bandwidth, the exact timing of each signaled tunnel is not of particular importance at this time.) Also, as an alternative to zero bandwidth signaling, each rearranging node may simply tear down all of its tunnels. However, the extra signaling involved to reestablish the tunnels (e.g., creating new state, etc.) may be too great a tradeoff to make this alternative worthwhile. Furthermore, while the tunnel is down the traffic over the tunnels cannot benefit from other, non-bandwidth, benefits of tunnels, such as, e.g., Fast Reroute (FRR), as will be understood by those skilled in the art.

After signaling its zero bandwidth tunnel(s), each rearranging node signals its tunnel(s) with its respective (original/desired) bandwidth a corresponding calculated time beyond the configured time Tr, the corresponding calculated time for each tunnel being inversely proportional to the respective bandwidth value of that corresponding tunnel. For instance, it is generally advantageous to place larger tunnels before smaller tunnels in order to place more tunnels (i.e., finding a place for larger tunnels, and "fitting" the smaller tunnels around them). Also, it may be better to place the larger tunnels on shorter paths (e.g., because larger tunnels are often "more important" than smaller tunnels, as will be understood by those skilled in the art). Accordingly, each tunnel may be signaled with its respective bandwidth at a time beyond the configured time Tr that substantially corresponds to a function of the inverse of the tunnel's size (e.g., "f(1/size)").

Also, in accordance with one or more embodiments described herein, the time beyond the configured time may also include an additional delay value, Q. For instance, it may be useful to include the delay value Q in order to account for any delays associated with signaling the zero bandwidth tunnels as described above (i.e., to ensure that substantially all rearranged tunnels in the network 100 are signaled with zero bandwidth prior to attempting to signal the tunnels with actual bandwidth values). The delay value Q may be controlled by the triggering node and sent within the trigger, or may be a value locally configured to be the same at each node 200 of the network. For example, Q may be larger in networks having thousands of tunnels (e.g., a few minutes, such as 10), or smaller for networks with few tunnels (e.g., a few milliseconds). By adding the delay value, the rearranging time for each tunnel is illustratively Tr+Q+f(1/size).

As an example, assuming nodes A-C above are rearranging nodes, each node will rearrange its corresponding tunnel T1-T3 (e.g., with rearranging process 244) according to the configured time and an addition time that corresponds to a function of the inverse of the tunnel's size, plus any associated delay value, Q. As mentioned above, Tr may be configured to be 3:00 AM on Monday (simply, "3:00" herein), and Q may be 10 minutes. Accordingly, then, each rearranging node will rearrange its tunnel(s) at 3:00+:10+f(1/size), or 3:10+f(1/size). As such, tunnel T3 may be rearranged at 3:10+ $\frac{1}{10}$, or 3:10.1, while T1 and T2 may be rearranged at 3:10+$\frac{1}{5}$, or 3:10.2.

Figure 5C:
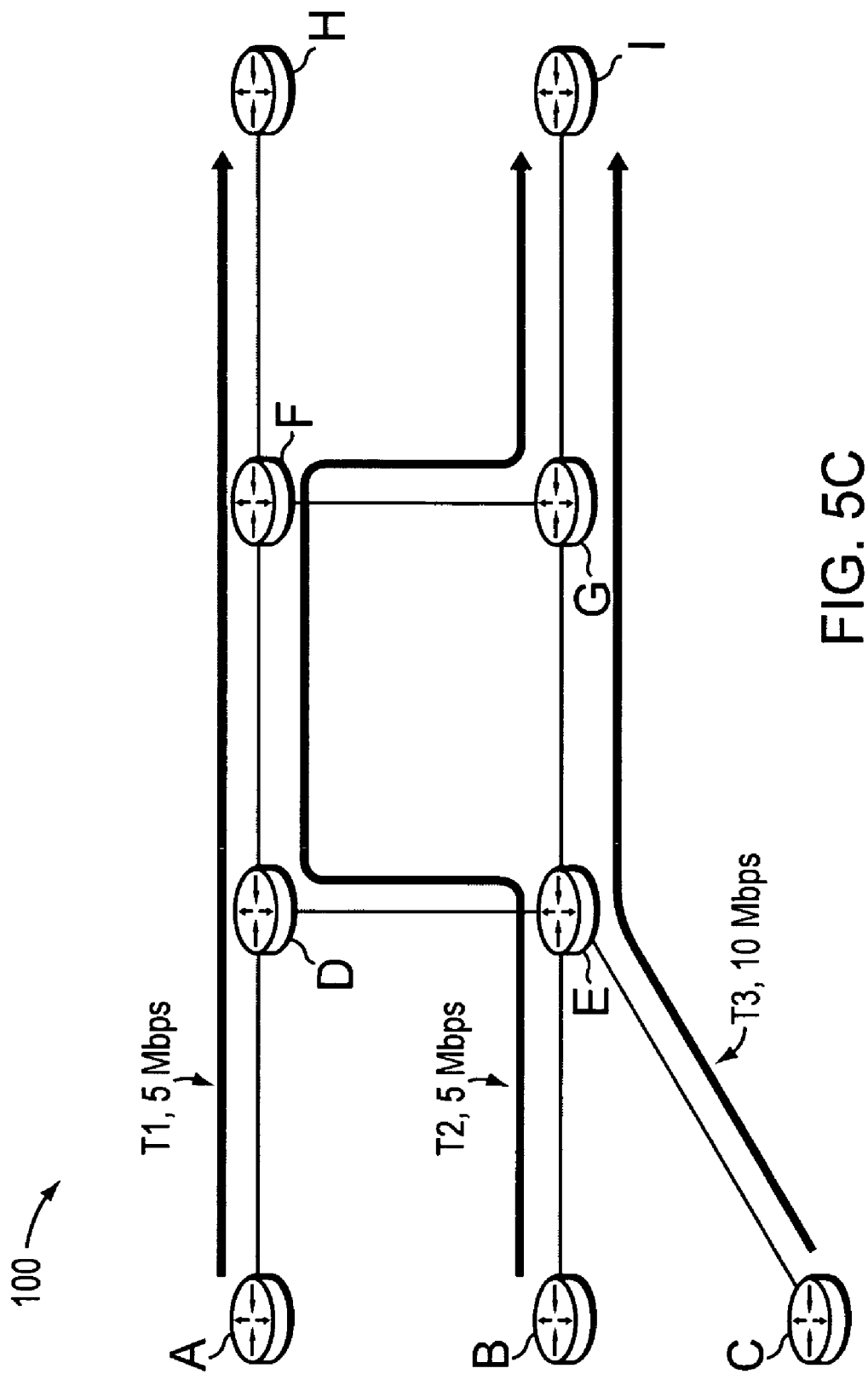

Referring again to FIG. 5B, of the three illustrative tunnels T1-T3, head-end rearranging node C signals T3 first at 3:10.1, having the desired bandwidth of 10 Mbps. Because no other tunnels (T1 or T2) have been signaled with their bandwidth, the shortest path (C-E-G-I) is available for T3, and T3 is so placed. FIG. 5C illustrates an example network 100 having tunnels (e.g., T3) signaled according to synchronized and dynamic tunnel placement. Then, at 3:10.2, T1 and T2 may be signaled having their respective bandwidths, 5 Mbps. Notably, because both tunnels are the same size, their placement may not conflict with one another, except where a race condition exists (i.e., where establishing one will block establishment of the other). Those skilled in the art will understand, however, that the illustrative values "5" and "10" are merely representative, and that often no two tunnels share exactly the same reserved bandwidth.

Regardless of placement order, T1 may be placed along its shortest path (A-D-F-H). However, because T3 has reserved 10 Mbps along link E-G (i.e., such that link E-G has less than 5 Mbps available, e.g., zero), tunnel T2 is now blocked along its shortest path. When T2 is signaled for its 5 Mbps, then, an alternate path is located through the network, e.g., B-E-D-F-G-I, as shown. While tunnel T2 is forced to take a slightly longer path, the overall benefit/trade off is that all three tunnels T1-T3 have been successfully placed, where before only the two smaller tunnels (T1-T2) were established.

In addition, the rearranging nodes may be configured to apply a shared multiplier ("k") to each corresponding calculated time (e.g., a universally configured multiplier or an additional value received within the trigger). For instance, a multiplier may be used to spread out the delay between calculated times for tunnels, such that more time may exist between signaling one tunnel from another. That is, rather than the inversely proportional values being simply 1 divided by the size of the tunnel (1/size), they may instead be computed as k divided by the size of the tunnel (k/size). For example, k equal to 10 results not in $\frac{1}{5}$ of a second (T1 and T2) and $\frac{1}{10}$ of a second (T3), but rather 2 seconds for T1 and T2, and 1 second for T3. Depending upon the sizes of the tunnels in the network and the speed of the signaling process, having a difference of 1 second may be beneficial over $\frac{1}{10}$ of a second. It should be noted, however, that too large of a multiplier may be adversely effective, such as where the spread is too large, and the smaller tunnels take too long to be signaled. Moreover, while the calculated times beyond the configured time are illustratively computed using "$\frac{1}{5}$" and "$\frac{1}{10}$," those skilled in the art will understand that the "5" and "10" in the examples described herein represent 5 Mbps and 10 Mbps, such that the actual time for 1/size may actually be $\frac{1}{5000000}$ and $\frac{1}{10000000}$ accordingly. Thus, for example, it may be beneficial to apply a multiplier to achieve results closer to $\frac{1}{5}$ and $\frac{1}{10}$, such as where k=1000000.

Further, a normalization may be applied to the calculated time of each tunnel. For instance, by normalizing the corresponding calculated time of each tunnel, large delays between tunnel signaling for vastly different-sized tunnels may be reduced. One example normalization comprises the logarithm (log) of the inverse proportion, e.g., a function of: log(1/size of tunnel). For example, rearranging two tunnels of 200 Gigabits per second and 10 kilobits per second would result in vastly different calculated times (e.g., $\frac{1}{20}$ Gbps vs. $\frac{1}{10}$ kbps). Normalizing the calculated time thus reduces the difference between the two tunnels, yet still maintains the desired tunnel signaling order described herein.

Optionally, according to one or more embodiments described herein, a node 200 that receives the trigger (e.g., a rearranging node) may return feedback to the triggering node indicating non-compliance/disagreement with the trigger (e.g., with feedback process 243). In particular, one or more nodes may not want to rearrange their tunnels in accordance with the trigger. If so, the node(s) may send feedback to the triggering node, e.g., embodied as another IGP advertisement 300 propagated throughout the network with a feedback field (e.g., sub-TLV 450 within a TLV 400, etc.). The triggering node (e.g., node C) receives the feedback, and may determine whether to send a cancellation notification (e.g., within an IGP advertisement 300, similar to the trigger above) to the rearranging nodes to request that the rearranging nodes not rearrange the tunnels (e.g., based on one or more flags 420 indicating as such).

Notably, the decision as to whether to send the cancellation may be based on a number/proportion of nodes disagreeing with the trigger, or based on other factors that consider from which particular one or more rearranging nodes the feedback was received. For instance, the feedback sent to the triggering node may simply indicate a disagreement (e.g., as one or more flags 420), or may include other useful information, such as a node type or weight. For example, larger nodes (e.g., POPs) may hold more "voting" weight as to whether they will rearrange their tunnels, since they may have hundreds or thousands of tunnels. Rearranging its tunnels in response to a smaller node, e.g., with one tunnel it is unable to place, may be an undue burden on the larger node. Accordingly, the larger node may indicate within the feedback that it is a "large" node (e.g., a configured type of node, or with a number of affected tunnels, etc.), or, illustratively, with a configured weight value for that node, which, for example, may represent the voting weight of the node.

Upon receiving a cancellation notification, the rearranging node may cancel its planned rearrangement, unless, for example, another triggering node has also sent a trigger that has not been cancelled. Notably, while the above describes sending the cancellation notification from the triggering node, an alternative would be to have each rearranging node receive the feedback, and perform the same decision-making process to determine whether to cancel the rearrangement (e.g., automatically in response to the feedback, based on the number and/or weight of feedbacks, etc.)

Figure 7:
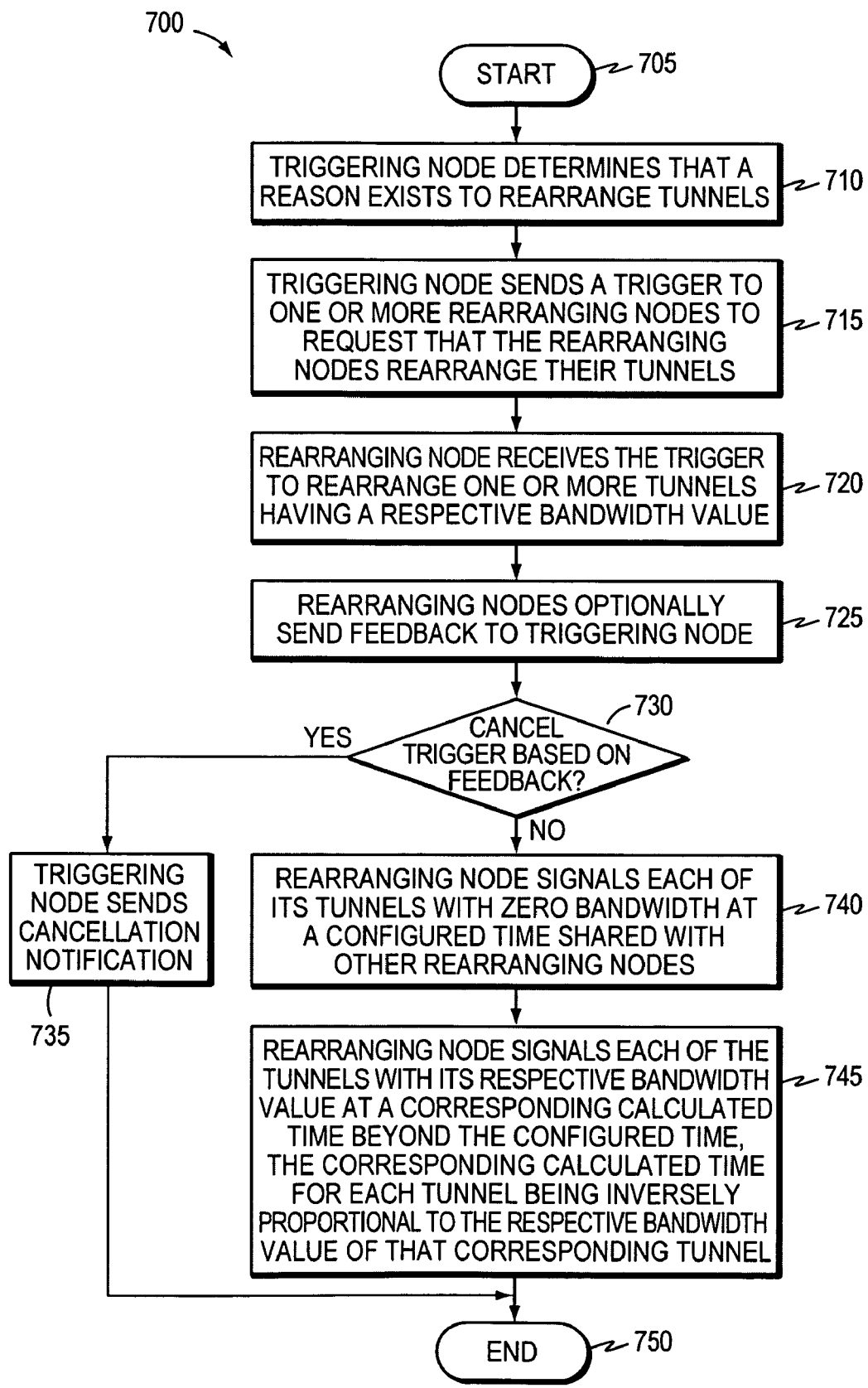
FIG. 7 illustrates an example procedure for efficient tunnel placement using distributed synchronization.

FIG. 7 illustrates an example procedure for efficient tunnel placement using distributed synchronization in accordance with one or more embodiments described herein. The procedure 700 starts at step 705, and continues to step 710, where a triggering node (e.g., node C) determines that a reason exists to rearrange tunnels in a computer network 100, such as for the reasons described above (inability to place tunnels, e.g., T3, high cost of tunnels, etc.). In response, the triggering node sends a trigger (e.g., embodied within an IGP advertisement 300) in step 715 to one or more rearranging nodes (e.g., nodes A-B, and D-H) to request that the rearranging nodes rearrange their tunnels. In step 720, the rearranging nodes (e.g., at least nodes A and B, illustratively) receive the trigger to rearrange their tunnels, each of which have a respective bandwidth value. Optionally, in step 725, one or more rearranging nodes may send feedback to the triggering node (e.g., within an IGP advertisement 300) indicating compliance, or more particularly, disagreement with the trigger. If the triggering node determines that the feedback merits cancellation of the trigger in step 730 (e.g., as described above based on a number of disagreeing nodes, the weight of the nodes, etc.), then the triggering node sends a cancellation notification (e.g., within an IGP advertisement 300) to the rearranging nodes in step 735 to request that no rearranging take place, and the procedure 700 ends in step 750.

If no cancellation notification is sent in step 735, each participating rearranging node (e.g., nodes A and B and node C, the triggering node) signals each of its tunnels (e.g., T1-T3, respectively) with zero bandwidth in step 740 at a configured time (Tr) shared with other rearranging nodes, for example, as contained within the configured time field in the trigger, as described above. Also as mentioned above, to avoid a burst of signals, each rearranging node may apply a random delay to the configured time so not all zero bandwidth signals are sent at the same time. In step 745 (for example, after waiting for a delay value to allow the zero bandwidth tunnels to be signaled throughout the network 100), each rearranging node signals each of its tunnels with its respective bandwidth value at a corresponding calculated time beyond the configured time, where the corresponding calculated time is inversely proportional to the respective bandwidth value of the corresponding tunnel. For example, as illustrative above, node A, B and C have signaled their tunnels T1-T3 with zero bandwidth along the shortest paths to their destinations in step 740 (e.g., at 3:00 AM). In step 745, then, node C signals T3 with its original (or desired) bandwidth (e.g., 10 Mbps) at the configured time (e.g., 3:00 AM), e.g., plus a delay (e.g., Q, 10 minutes), plus a time that is inversely proportional to the original bandwidth (e.g., $\frac{1}{10}$, where k=1), or 3:10.1 AM. Also in step 745, node A and node B signal T1 and T2 with their original bandwidth (e.g., 5 Mbps) at 3:10.2 AM (e.g., 3:10 AM plus $\frac{1}{5}$). In this way, T3 may be placed first (e.g., by $\frac{1}{10}$ of a second), such that the larger tunnel is placed first along its shortest (available) path (e.g., C-E-G-I), and a smaller tunnel (T2) is routed over a slightly longer path (e.g., B-E-D-F-G-I) as described above. The procedure 700 ends in step 750, having efficiently placed tunnels in the network 100 in a distributed and synchronized manner.

Advantageously, the novel techniques described herein efficiently place tunnels (e.g., rearranges placed and unplaced tunnels) using distributed synchronization in a computer network. By providing synchronization to distributed placement (rearrangement) of tunnels according to size (in an order inversely proportional to tunnel size), the novel techniques allow for more optimal placements of tunnels. In particular, more tunnels may be placed (especially larger tunnels) by reducing establishment blocking due to fragmented bandwidth, and an overall average cost of tunnels through the network may be reduced. Also, the dynamic aspects of one or more embodiments described herein alleviate the need for cumbersome and inefficient manual configuration. Notably, while it may be beneficial to have all head-end nodes of the network 100 participate as rearranging nodes, gains may be sufficient utilizing only a subset of the head-end nodes, as will be understood by those skilled in the art.

While there have been shown and described illustrative embodiments that efficiently place tunnels using distributed synchronization in a computer network, it is to be understood that various other adaptations and modifications may be made within the spirit and scope of the present invention. For example, the embodiments have been shown and described herein primarily directed to MPLS TE-LSPs and RSVP signaling. However, the embodiments of the invention in their broader sense are not so limited, and may, in fact, be used with other tunneling and reservation protocols, as mentioned herein and as will be understood by those skilled in the art. Also, while the above description mentions the use of CSPF algorithms to compute tunnel paths, other suitable algorithms may also be used advantageously in accordance with one or more embodiments described herein. Further, while the above description describes a triggering node sending a trigger to one or more rearranging nodes, the trigger need not come from a triggering node, but may be generated internally at each node. For example, where the rearrangement of tunnels is scheduled based on a rearrangement timer, the "trigger" received is an internal trigger that the timer has expired.

In addition, although the illustrative embodiments described herein are directed to MPLS, it should also be noted that the embodiments described herein may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:

receiving a trigger at a rearranging node to rearrange one or more tunnels having a respective bandwidth value;

signaling each of the tunnels with zero bandwidth at a configured time shared by the rearranging node and one or more other rearranging nodes; and signaling each of the tunnels with its respective bandwidth value at a corresponding calculated time beyond the configured time, the corresponding calculated time for each tunnel being inversely proportional to the respective bandwidth value of that corresponding tunnel.

2. The method as in claim 1, further comprising:

receiving the configured time in the trigger.

3. The method as in claim 1, wherein the configured time is based on a synchronized network time shared by the rearranging nodes.

4. The method as in claim 1, further comprising:

including a delay value within each corresponding calculated time, the delay value shared by the rearranging nodes.

5. The method as in claim 4, further comprising:

receiving the delay value in the trigger.

6. The method as in claim 1, further comprising signaling each tunnel with zero bandwidth at the configured time plus a random delay value.

7. The method as in claim 1, further comprising:

normalizing the corresponding calculated time of each tunnel.

8. The method as in claim 7, wherein the step of normalizing further comprises:

normalizing the corresponding calculated time as a logarithm of the inverse proportion.

9. The method as in claim 1, further comprising:

applying a multiplier to each corresponding calculated time, the multiplier shared by the rearranging nodes.

10. The method as in claim 9, further comprising receiving the multiplier in the trigger.

11. A method, comprising:

determining that a reason exists to rearrange tunnels having a respective bandwidth value of a network; and, in response, sending a trigger to one or more rearranging nodes to request that the rearranging nodes i) signal each of the tunnels with zero bandwidth at a configured time shared by the rearranging nodes, and ii) signal each of the tunnels with its respective bandwidth value at a corresponding calculated time beyond the configured time, the corresponding calculated time for each tunnel being inversely proportional to the respective bandwidth value of that corresponding tunnel.

12. The method as in claim 11, further comprising:

sending the configured time in the trigger.

13. The method as in claim 11, further comprising:

sending a delay value within the trigger, the delay value to be included within each corresponding calculated time at each rearranging node.

14. The method as in claim 11, further comprising:

sending a multiplier within the trigger, the multiplier to be applied to each corresponding calculated time at each rearranging node.

15. The method as in claim 11, further comprising:

performing the steps of determining and sending at one of the rearranging nodes.

16. The method as in claim 11, further comprising:

performing the steps of determining and sending at a network management system.

17. The method as in claim 11, further comprising:

determining that a reason exists to rearrange tunnels based on at least one of an inability to place one or more tunnels, one or more associated costs of tunnels, a rearrangement timer, a decrease in successful tunnel establishments over time, a number of unsuccessful tunnel establishments, an increase in unsuccessful tunnel establishments over time, and an increase in newly established tunnel costs.

18. The method as in claim 11, further comprising:

receiving feedback to the trigger from one or more of the rearranging nodes; and determining whether to send a cancellation notification to the rearranging nodes to request that the rearranging nodes not rearrange the tunnels based on the feedback.

19. The method as in claim 18, further comprising:

determining whether to send the cancellation notification based on from which particular one or more rearranging nodes the feedback is received.

20. A node, comprising:

one or more network interfaces adapted to receive triggers to rearrange one or more tunnels having a respective bandwidth value;

one or more processors coupled to the network interfaces and adapted to execute one or more processes; and a memory adapted to store a rearranging process executable by each processor, the rearranging process when executed adapted to: i) receive a trigger to rearrange the tunnels, ii) signal each of the tunnels with zero bandwidth in response to the trigger at a configured time shared by the node and one or more other rearranging nodes in response to a received trigger, and iii) signal each of the tunnels with its respective bandwidth value in response to the trigger at a corresponding calculated time beyond the configured time, the corresponding calculated time for each tunnel being inversely proportional to the respective bandwidth value of that corresponding tunnel.

* * * * *

UNITED STATES PATENT AND TRADEMARK OFFICE
CERTIFICATE OF CORRECTION

| | |
|---|---|
| PATENT NO. | : 7,551,569 B2 |
| APPLICATION NO. | : 11/590507 |
| DATED | : June 23, 2009 |
| INVENTOR(S) | : Jean-Philippe Vasseur |

Page 1 of 1

It is certified that error appears in the above-identified patent and that said Letters Patent is hereby corrected as shown below:

Col. 9, Line 18, delete "noyel", substitute -- novel --

Col. 12, Line 14, delete "1/20Gbps", substitute -- 1/200Gbps --

Signed and Sealed this

Thirteenth Day of October, 2009

David J. Kappos
*Director of the United States Patent and Trademark Office*